US006449481B1

(12) United States Patent
Kwon et al.

(10) Patent No.: US 6,449,481 B1
(45) Date of Patent: Sep. 10, 2002

(54) METHOD FOR DETERMINING EXECUTION TIME OF INTER-FREQUENCY HARD HANDOFF AND ESTABLISHING THE HARD HANDOFF ENVIRONMENT

(75) Inventors: Suk-hyoung Kwon, Daejon; Wan-soo Kim, Seoul, both of (KR)

(73) Assignee: Samsung Electronics, Co., Ltd. (KR)

( * ) Notice: Subject to any disclaimer, the term of this patent is extended or adjusted under 35 U.S.C. 154(b) by 0 days.

(21) Appl. No.: 09/333,545

(22) Filed: Jun. 15, 1999

(30) Foreign Application Priority Data

Jun. 15, 1998 (KR) .............................................. 98/22290

(51) Int. Cl.⁷ ................................................ H04Q 7/20
(52) U.S. Cl. ....................................... 455/437; 455/439
(58) Field of Search ................................ 455/436, 437, 455/442, 524, 525, 438, 440, 439, 443, 444; 370/331, 335, 342

(56) References Cited

U.S. PATENT DOCUMENTS

| 5,327,575 | A | * | 7/1994 | Menich et al. ............... 455/440 |
| 5,594,718 | A | * | 1/1997 | Weaver, Jr. et al. ......... 455/437 |
| 5,982,759 | A | * | 11/1999 | Jo et al. ....................... 370/331 |
| 6,070,075 | A | * | 5/2000 | Kim ............................ 455/437 |

* cited by examiner

Primary Examiner—Nguyen T. Vo
(74) Attorney, Agent, or Firm—Dilworth & Barrese, LLP

(57) ABSTRACT

A method for determining the execution time and handoff direction of a hard handoff by a base station controller in a code division multiple access (CDMA) system. The execution time and handoff direction is determined for a mobile station moving between two base station transceiver having different frequency allocations (Fas). The service region of the CDMA system is divided as individual cells where each cell further comprises one or more sectors (sub-cells). Sub-cells are either common frequency sub-cells or border frequency sub-cells. Common frequency sub-cells are defined as those sub-cells for which the common frequencies of the neighboring sub-cells are all in use. Correspondingly, a border frequency sub-cells defines a sub-cell for which the common frequencies of the neighboring sub-cells are not all in use. The method of the present invention generally comprises the steps of: receiving a pilot strength measurement message (PSMM) from the mobile station by the base station controller (BSC), the PSMM including a plurality of pilot signals each having a pilot signal strength; upon receiving the PSMM by the BSC, determining whether all sub-cells with which the mobile station is currently in communication are border frequency sub-cells; if it least one sub-cell is determined not to be a border frequency sub-cell, executing a general handoff; if all sub-cells are determined to be border frequency sub-cells, periodically ordering the PSMM from all sub-cells with which the mobile station is currently in communication by the BSC; analyzing a received PSMM transmitted from the mobile station in response to the PSMM order issued by the BSC to determine whether the pilot signal strengths received from all sub-cells are lower than a predetermined power level, T_DOWN, and activating a timer set to a predetermined time, T_TDOWN if said pilot signal strengths received from all sub-cells are lower than a predetermined power level; if the timer expires without interruption during the time interval T_TDOWN ordering the mobile station to execute an intra-cell inter-frequency hard handoff to a common frequency that all base transceiver stations service.

12 Claims, 4 Drawing Sheets

METHOD FOR DETERMINING EXECUTION TIME OF INTER-FREQUENCY HARD HANDOFF AND ESTABLISHING THE HARD HANDOFF ENVIRONMENT

BACKGROUND OF THE INVENTION

1. Field of the Invention

The present invention relates generally to wireless telecommunications and more particularly to a method for determining the execution time and handoff direction of a hard handoff by a base station controller (BSC) in a code division multiple access (CDMA) mobile telecommunication system.

2. Description of the Related Art

A cellular mobile telecommunication system divides a total service area into a plurality of cells where each cell is serviced by a base transceiver station (BTS). By centralizing the base transceiver stations in each cell, subscribers are able to communicate with each other as they move between cells. That is, the cellular system configuration makes it possible for a mobile station to continue a call when the mobile station moves out of a cell being served by one BTS and into another cell being served by another BTS.

Figure 1:
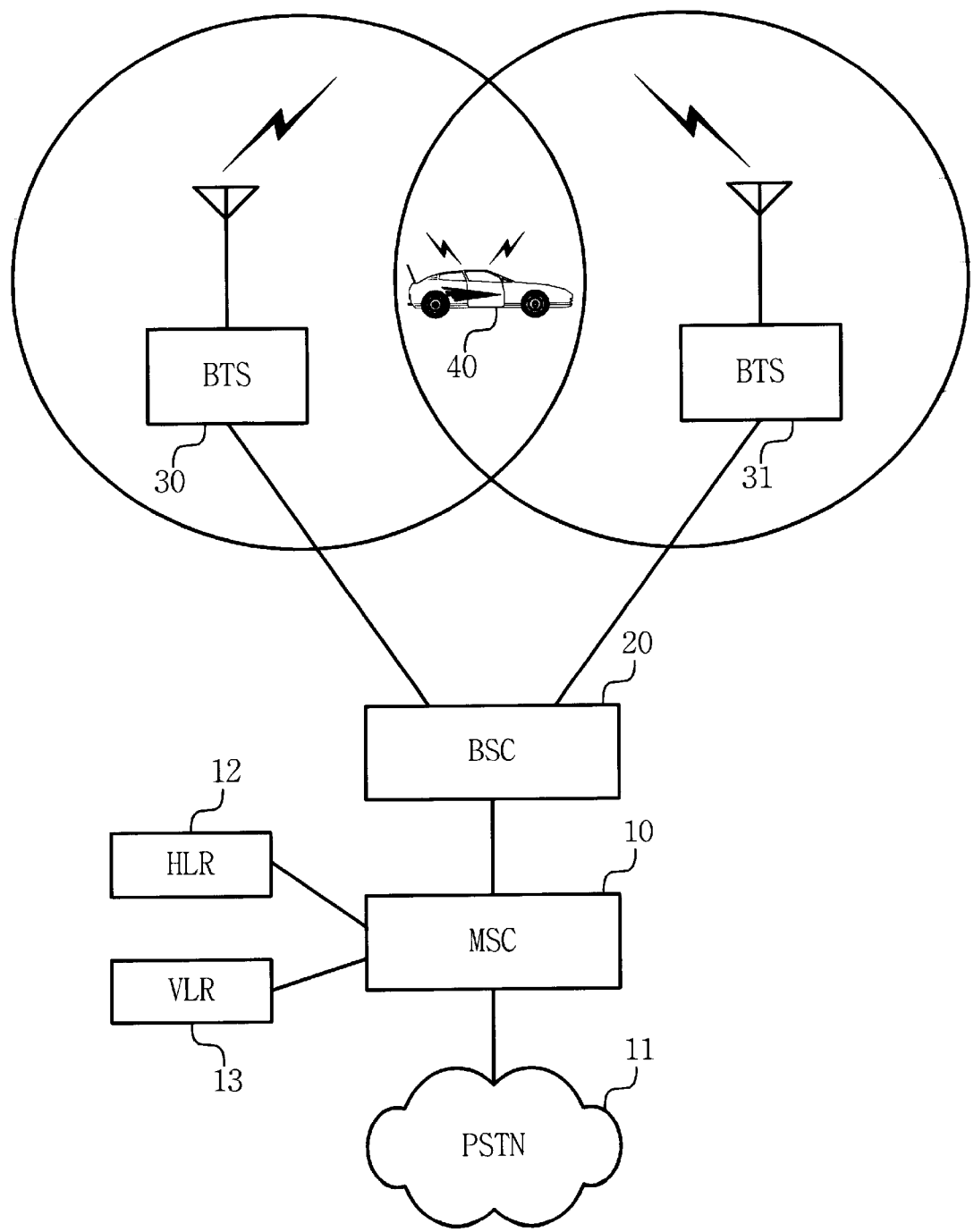

FIG. 1 illustrates the structure of a cellular system using conventional CDMA technology. As illustrated in FIG. 1, the cellular system includes a mobile station (MS) 40 receiving mobile telecommunication services, base transceiver stations (BTSs) 30, 31 providing the MS 40 with the mobile telecommunication services, a base station controller (BSC) 20 controlling the BTSs 30, 31 and a mobile switching center (MSC) 10 connecting the BSC 20 to the public switched telephone network (PSTN) 11. The MSC provides services by receiving information about the MS 40 from a home location register (HLR) 12, and a visitor location register (VLR) 13.

In the cellular system described in FIG. 1, a link from BTSs 30, 31 to MS 40 is commonly referred to in the art as a forward link, and a link from MS 40 to BTSs 30,31 is commonly referred to as a reverse link. All forward links associated with a particular BTS share the same pseudorandom noise (PN) sequence offset. The PN offset is transmitted through a pilot channel as one of the forward channels, referred to as a pilot signal. The pilot signal serves as an identifying signal distinguishing one BTS from another.

A cellular system can employ techniques to accommodate additional users. One such technique is cell division. In cell division a cell is trisected by separating three (3) 120 degree antennas at a 120° spacing to each other, thereby dedicating an antenna to each of the three sectors. A mobile station recognizes each sector antenna as a separate BTS.

Cellular systems and personal communication services (PCS) systems using CDMA technology provide various types of handoffs to guarantee the continuance of a call. Handoffs allow the continuance of a call by establishing a new channel within a short period of time from losing a currently established channel due to movement of the mobile station from one service area to another. The time duration of losing one channel and establishing another is short enough such that a user will find it difficult to detect that a handoff has occurred.

When the capacity of a cellular system must be upgraded to accommodate additional users, the cellular system assigns additional frequencies (i.e., channels) to the BTS. A frequency assignment is commonly referred to as an (FA). This situation often occurs in an urban environment where a city center requires many FAs due to the dense urban population. By contrast, a suburban setting would require fewer FAs.

In a conventional cellular system, when a mobile station, which is communicating via a specific frequency channel (i.e., FA), moves to a neighboring service area being served by another BTS which does not service the specific frequency channel, or the BTS does not have an idle traffic channel mobile station recognizes that it is moving into a region being serviced by a neighboring BTS by receiving a pilot signal via a continuously transmitted pilot channel of the neighboring BTS. In a mobile assisted hard handoff, conventional systems must install a separate pilot receiver in the mobile station to identify pilot signals from a neighboring BTS to support the hard handoff.

A hard handoff method using pilot signals is disclosed in U.S. Pat. No. 5,594,718, "Method and apparatus for providing mobile unit assisted hard handoff from a CDMA communication system to an alternative access communication system".

In a mobile assisted hard handoff, the mobile station detects whether the strength of the pilot signal of a neighboring BTS is satisfactory using the pilot transmitter/receiver specially installed in the mobile station. If the mobile station determines that the strength of the pilot signal is satisfactory, it then calculates handoff decision parameters, such as a handoff execution time, to demand a handoff to a BSC. That is, the conventional system describes a mobile assisted handoff whereby the mobile station demands a handoff to the BSC at an execution time when the strength of the pilot signal of the neighboring BTS is equal to a pre-determined power level, T_ADD.

If the transmission frequency of the neighboring BTS detected by the mobile station is being maintained as a dummy pilot solely for the purpose of hard handoffs, the BSC decides that, despite the mobile's demand for a handoff, there is no corresponding communication resources available in the neighboring BTS. The BSC instead completes an inter-frequency hard handoff by performing a hand-down to a common frequency that both the currently servicing BTS and neighbor BTS commonly use (i.e., a hand-down allowance frequency). The BSC then performs an inter-cell soft handoff to the neighboring BTS.

SUMMARY OF THE INVENTION

The present invention discloses a method for determining the execution time and handoff direction of an inter-frequency hard handoff in the case where a mobile station is moving between two base station transceivers have different frequency allocations (i.e. different FAs).

The method of the present invention generally comprises the steps of: receiving a pilot strength measurement message (PSMM) from the mobile station by the base station controller (BSC), the PSMM including a plurality of pilot signals each having a pilot signal strength; upon receiving the PSMM by the BSC, determining whether all sub-cells with which the mobile station is currently in communication are border frequency sub-cells; if it least one sub-cell is determined not to be a border frequency sub-cell, a general handoff is performed; otherwise if all sub-cells are determined to be border frequency sub-cells, periodically ordering the PSMM from all sub-cells with which the mobile station is currently in communication by the BSC; analyzing a received PSMM transmitted from the mobile station in response to the PSMM order issued by the BSC to determine whether the pilot signal strengths received from all sub-cells are lower than a predetermined power level, T_DOWN, and activating a timer set to a predetermined time, T_TDOWN if said pilot signal strengths received from all sub-cells are lower than a predetermined power level; if the timer expires without interruption during the time interval T_TDOWN ordering the mobile station to execute an intra-cell inter-frequency hard handoff to a common frequency that all base transceiver stations service.

The present invention is described in the context of a mobile telecommunication system having a sectorized cell structure, however, it is more generally applicable to systems having configurations which do not employ such a structure.

An advantage of the present invention is that it is implemented exclusively in software without the need for additional hardware.

DESCRIPTION OF THE PREFERRED EMBODIMENTS

The present invention discloses a method for allowing a base station controller (BSC) to determine the execution time of an inter-frequency hard handoff in a mobile telecommunication system. An intra-cell inter-frequency hard handoff may be defined as one where a mobile station breaks a frequency channel and switches over to another frequency. To determine the execution time of an inter-frequency hard handoff, information must be stored in a database of a base transceiver station (BTS), managed by the BSC. The information includes the frequency assignment (FA) for each sector within each BTS. The present invention defines sectors as sub-cells. For example, assuming that a BTS service region is divided (sectorized) into three (3) sectors with two (2) frequencies FA1, FA2 being assigned to each sector. The service region is said to comprise six (6) sub-cells (i.e. (3 sectors)×(2 Fas per sector) ). A sub-cell is further defined as being either a common frequency sub-cell or a border frequency sub-cell based on the service status of the common frequencies. That is, a sub-cell is defined as a common frequency sub-cell whenever the common frequencies of the neighboring sub-cells are all in use. A sub-cell is defined as a border frequency sub-cell whenever the common frequencies of the neighboring sub-cells are not all in use.

In addition to the stored information, described above, an additional information field will be stored in the database for each sub-cell, to represent the service status of those frequencies which are common to neighboring sub-cells. The additional field will indicate which of the assigned frequencies for a particular service region are currently in service or not in a neighboring sub-cell.

Figure 2:
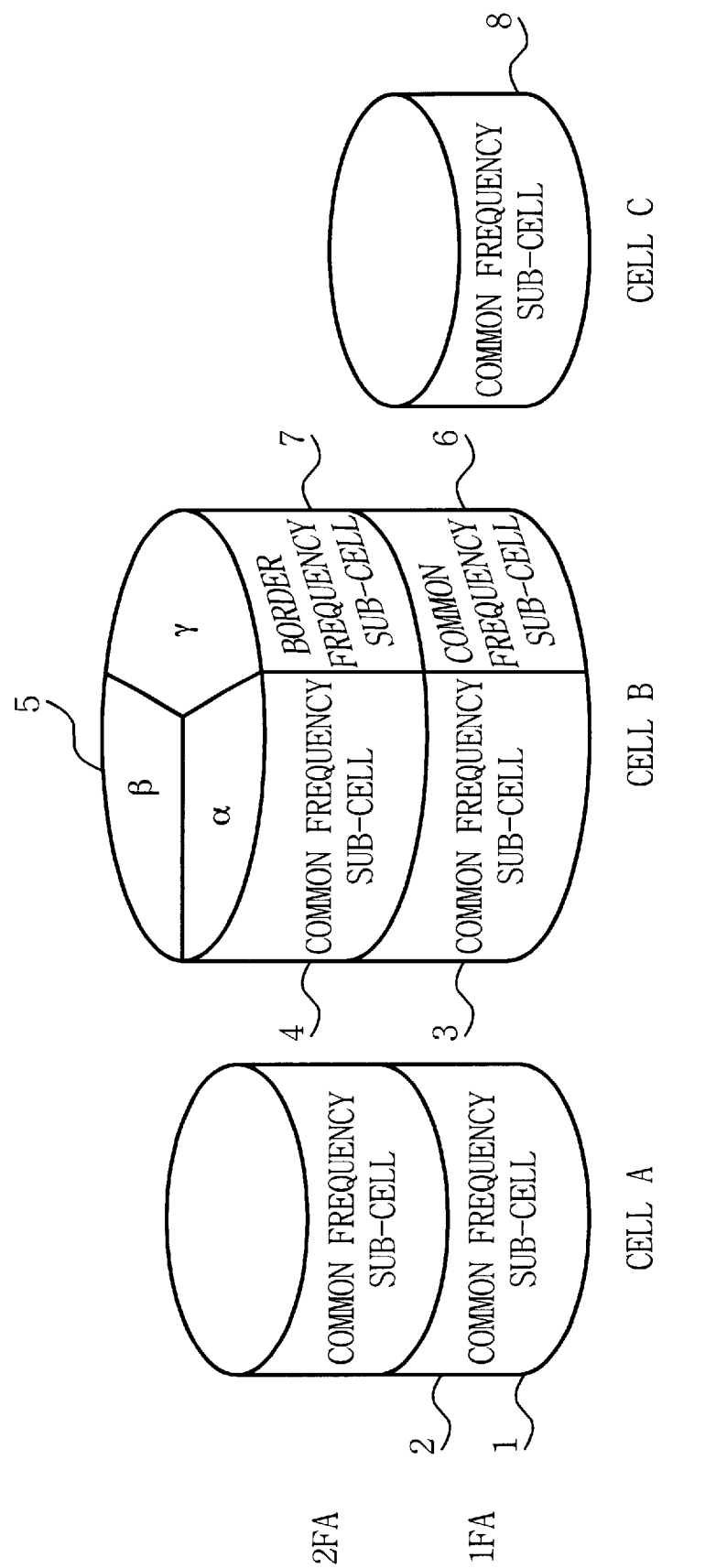

FIG. 2 is an exemplary illustration of a service region divided into three cells, "A", "B" and "C". The service region is being served by a BTS. As shown, cell "A" is further divided into two sub-cells with no sectorization of the sub-cells. In the present example, Cell "A" has been allocated (i.e., manages) two frequency assignments, FA1 associated with sub-cell (1), and FA2 associated with sub-cell (2). The frequency assignment/sub-cell association may be represented in shorthand notation as: FA1(1) and FA2(2). Namely, frequency assignment 1 (i.e. FA1) is assigned to sub-cell (1) and frequency assignment 2 is assigned to sub-cell (2).

Referring now to cell "B" of FIG. 2, being adjacent to cell "A", cell "B" in the exemplary illustration has been allocated the same two (2) frequency assignments as cell "A", namely FA1 and FA2. Frequency assignment FA2 is assigned to sub-cells (3) and (6). Cell "B", however, differs from cell "A" in that the sub-cells of cell "B", 3-7, have been sectorized into three sectors (alpha, beta, gamma). Sectors alpha and gamma are adjacent to Cell "A" and sector gamma is adjacent to cell "C". Cell "B" manages frequencies FA1 and FA2. Referring now to cell "C" which contains one sub-cell, sub-cell (8) which is not sectorized. Cell "C" in the illustrative example manages 1 FA frequence assignment FA1.

An explanation will be now be provided describing each of the aforementioned sub-cells as being either a common frequency sub-cell or a border frequencies sub-cell. Beginning with Cell "A", because cell "A"'s neighboring sub-cells (i.e., sub-cells 3 and 4 of cell "B") service all the frequencies managed by cell "A" (i.e., FA1, FA2) sub-cells 1 and 2 of cell are defined as common frequencies sub-cells. Correspondingly, with regard to cell "B", sub-cells 3, 4, and 5 of sectors alpha and beta are common frequency sub-cells because cell "A" services all frequencies (i.e. FA1 and FA2) managed by sectors alpha and beta which are adjacent to cell "A".

In the case of sub-cell (6) for the gamma sector of cell "B", which is adjacent to cell "C", sub-cell (6) is defined as a common frequency sub-cell because adjacent cell "C" services FA1. By contrast, sub-cell (7) of cell "B" is defined as a border frequency sub-cell because adjacent cell "C" does not service FA2, the frequency assignment of sub-cell (7).

Correspondingly, with regard to Cell "C", because adjacent cell "B" services the frequency assigned to Cell "C", namely, FA1, sub-cell (8) of cell "C" is defined as a common frequency sub-cell.

It is not guaranteed that a border frequency sub-cell can receive telecommunication services to the corresponding frequency in a neighboring BTS continuously according to the direction of a mobile station's movement. Therefore, the mobile station currently being served in the border frequency sub-cell attempts to execute an intra-cell inter-frequency hard handoff to a common frequency sub-cell first, and if unsuccessful, then attempts an inter-cell soft handoff to a target cell for handoff. A target cell may be defined as a cell towards which a mobile station is moving.

To execute a soft handoff to a target cell, the BTS must have previously established at least one frequency among the plurality of frequencies in service as a hand-down allowance frequency. The hand-down allowance frequency to be established should be a common frequency that all BTSs can commonly service. The allocation of such a frequency makes it possible for the soft handoff to be executed to any BTS whenever a mobile station initiates a call.

If the information of the sub-cell according to the service status of BTS is stored and the frequency allowance for a hand down is completed, the BSC orders a pilot strength measurement message (PSMM) by periodically sending a pilot measurement request order (PMRO) to the mobile station. The BSC monitors the radio environment of the mobile station by using the PSMM. The BSC establishes the period of the PMRO and stores it in the BTS database.

If an intra-cell inter-frequency hard handoff is performed, there are additional requirements. The BSC must set a standard parameter, T_DOWN, which is a predefined threshold corresponding to a received signal strength value of a pilot signal. If the pilot signal strength received by the mobile station is below T_DOWN for a predetermined time an inter-frequency hard handoff will be executed. The T_DOWN value is established at a level higher than the conventional threshold, T_DROP, commonly used in connection with making a hard handoff.

According to the method of the present invention, when the BTS orders the mobile station to make an intra-cell inter-frequency hard handoff the following three conditions must be satisfied:

Condition 1: all sub-cells in which the mobile station is establishing the channel are composed of only border frequency sub-cells.

Condition 2: all pilot signal strengths of sub-cells in which the mobile station is establishing a channel are less than T_DOWN.

Condition 3: The pilot signal strengths of condition 2 are less than the threshold T_DOWN for a continuous time, equal to or greater than a predetermined time T_TDOWN.

Therefore, the BSC can determine the execution time of an intra-cell inter-frequency hard handoff by confirming whether the three conditions above have been satisfied by analyzing the PSMMs received from the mobile station.

Figure 3:
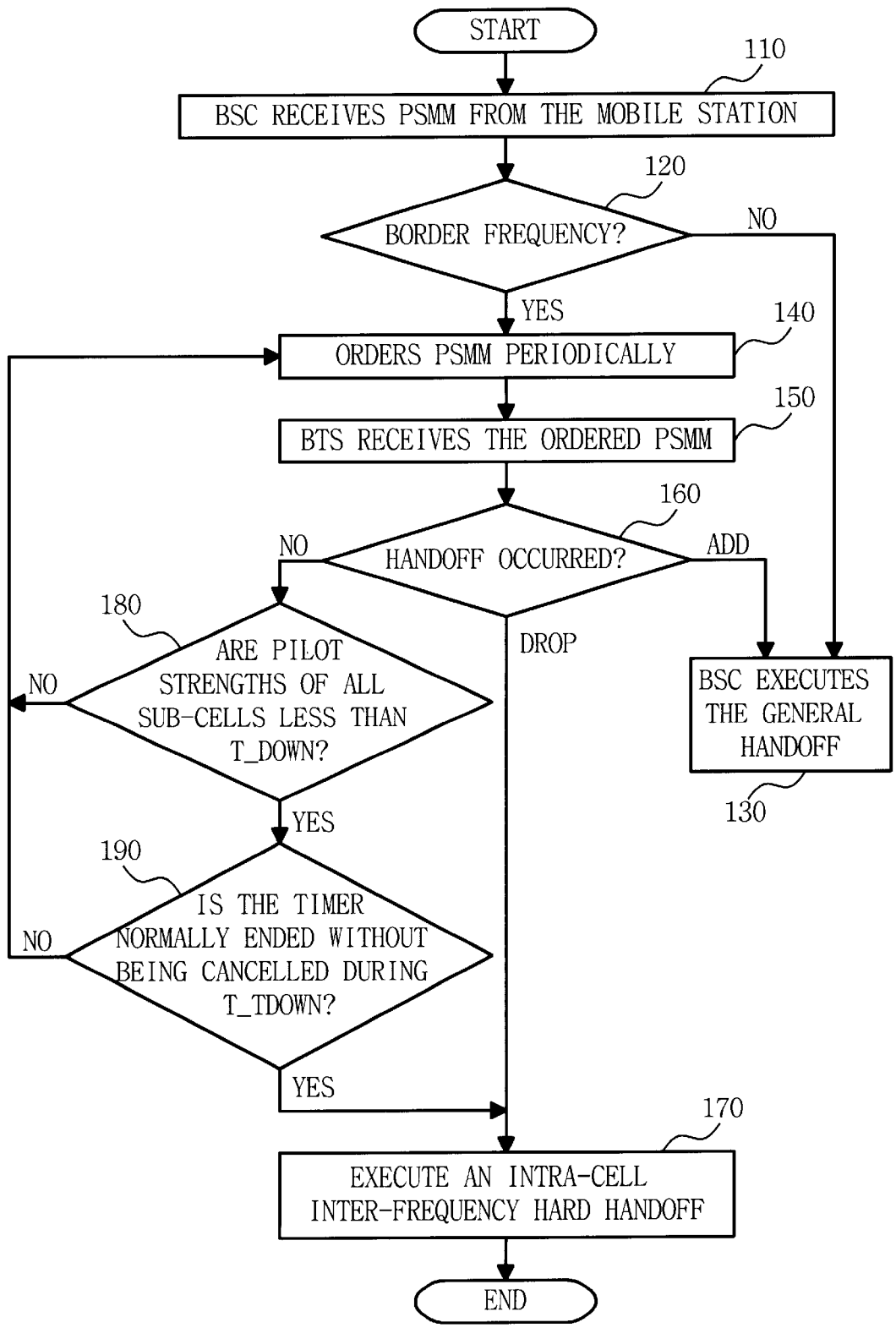

FIG. 3 is a flow chart illustrating the method of the present invention for determining the execution time of an intra-cell inter-frequency hard handoff. First, a BSC receives a pilot strength measurement message (PSMM) from the mobile station, at step 110. From the received message, the BSC can determine whether the sub-cells the mobile station is currently in communication (i.e., an established channel) with are border frequency sub-cells, at step 120. If any of the sub-cells in current communication with the mobile station are not border frequency sub-cells, the BSC executes a general (i.e., soft) handoff, at step 130. In particular, the BSC performs a soft handoff to a target BTS in a common frequency sub-cell if one exists.

In the situation where it is determined that all sub-cells in which a mobile station is in current communication are only border frequency sub-cells, the BSC determines that the neighboring BTSs cannot service the frequency in present use by the mobile station a soft handoff cannot be performed. As such, the mobile station may still be able to execute an intra-cell inter-frequency hard handoff. To make such a determination the BSC orders a PSMM from the mobile station by sending a PMRO message, at step 140, to determine whether the mobile station is moving continuously toward the direction of a BTS that cannot provide services. The mobile station receives the PMRO and sends a PSMM to the BSC by measuring the strengths of all pilot signals presently detectable, then the BTS receives the ordered PSMM as a response, at step 150.

The BTS determines whether the necessity of a handoff has occurred by analyzing the PSMM periodically received in accordance with the PMRO order, at step 160. As a result of the determination, when the necessity of a handoff has not occurred, the BSC compares the pilot strengths of all sub-cells with which the mobile station is currently in communication, with T_DOWN, a pre-defined threshold level, to determine the status of movement of the mobile station, at step 180. If the pilot strengths of all sub-cells are less than T_DOWN, the BSC activates a timer set to T_TDOWN.

As a result of analyzing the PSMM, when the signal strength from all sub-cells are such that at least one received value is not less than the threshold signal level T_DOWN, or when an additional channel establishing for a common frequency sub-cell, the timer is canceled. If the timer expires without being canceled during the time interval T_TDOWN, at step 190, the BSC orders the mobile station to execute an intra-cell inter-frequency hard handoff, at step 170. This occurs as a result of the strengths of all pilots being continuously maintained at less than or equal to T_DOWN during the time interval T_TDOWN.

At step 160, if the strength of the pilot signal of the BTS is not included in the PSMM being periodically received, the BSC determines that a handoff drop has occurred and executes an inter-frequency hard handoff, at step 170. That is, the mobile station is ordering a Drop for the channels currently connected to all sub-cells. In this situation, the channel quality has been so severely degraded that immediate action must be taken.

In step 160, if a new pilot signal has been added to the PSMM being received, the BSC determines that a handoff has occurred and executes a general handoff, at step 130. That is, the mobile station is ordering to add a channel corresponding to the newly detected sub-cells.

In step 170, the BSC orders the mobile station to execute the intra-cell inter-frequency hard handoff to the hand-down allowance frequency. After the intra-cell inter-frequency hard handoff is performed, the BSC completes the handoff by determining a target BTS and executing the steps associated with a normal soft handoff.

Figure 4:
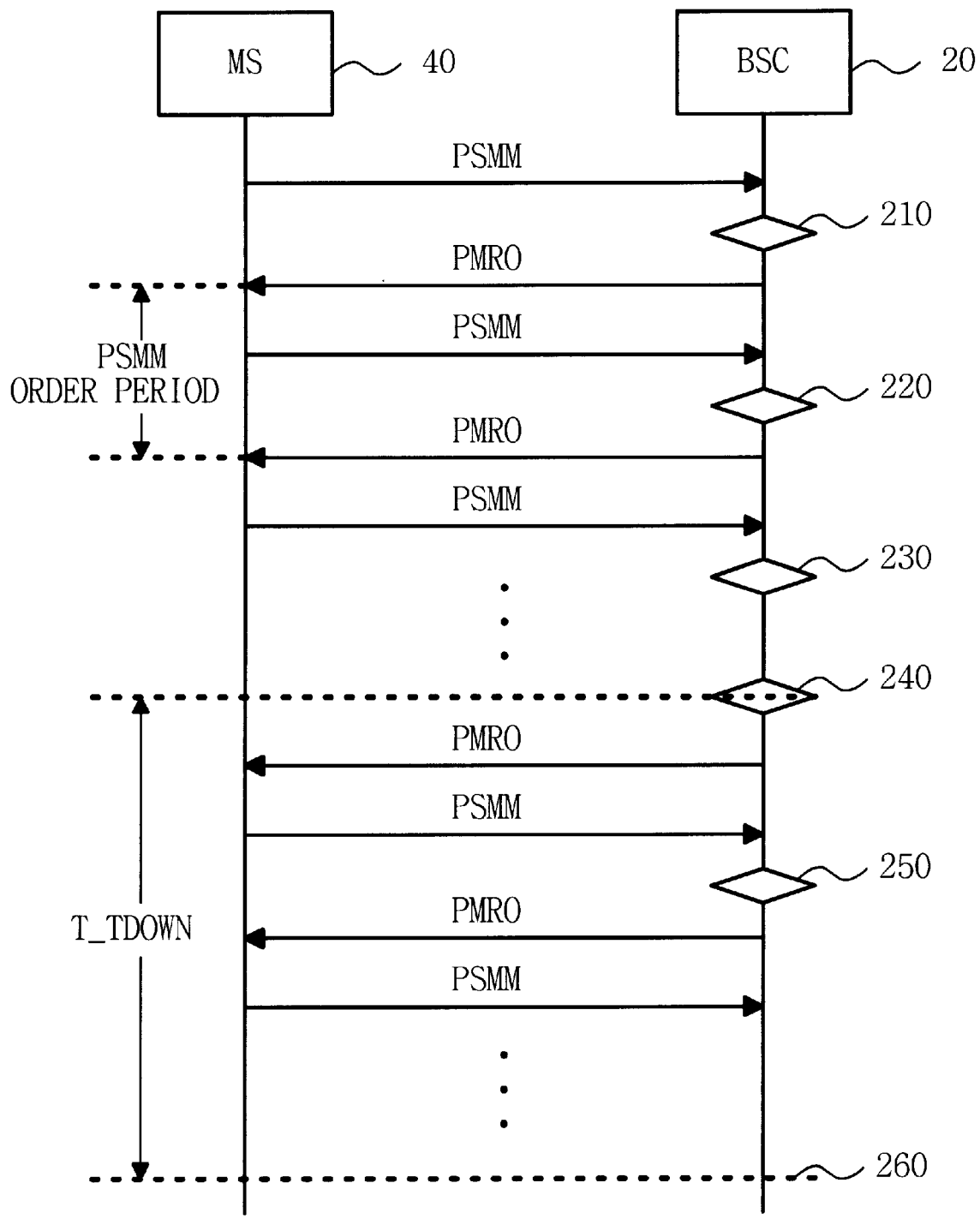

FIG. 4 is a message flow illustrating a method for determining the execution time of an intra-cell inter-frequency hard handoff according to the present invention. The mobile station 40 transmits the PSMM to the BSC periodically, or whenever it detects a new pilot signal, and the BSC 20 receives the PSMM from the mobile station 40. Then, the BSC confirms that all pilot signals reported from the mobile station through the PSMM are border frequencies and starts to monitor the intra-cell inter-frequency hard handoff, at step 210.

For an intra-cell inter-frequency hard handoff, the BSC sends a PMRO to the mobile station periodically according to the PSMM order period. If the mobile station responds to the PSMM, the BSC determines whether the strengths of the pilot signals received through the PSMM are all less than T_DOWN, at step 220. IF the strengths of the received pilot signals are all not less than T_DOWN, then the BSC sends the PMRO again at the next period, and repeats the steps of comparing the received PSMM with T_DOWN again at step 230.

If the strengths of the pilot signals received through the PSMM are all less than T_DOWN, the BSC activates a T_TDOWN timer, at step 240. The BSC then sends a PMRO and receives the PSMM continuously.

By continuously examining the strengths of pilot signals received through the PSMM, the BSC determines whether the strength of all received pilot signals are less than T_DOWN for the continuous period defined by T_TDOWN, at step 250. If the determination is satisfied, the BSC executes the intra-cell inter-frequency hard handoff, at step 260.

The mobile station which executes the intra-cell inter-frequency hard handoff by the order of the BSC, can easily execute the soft handoff to the target BTS.

While the invention is susceptible to various modification and alternative forms, specific embodiments thereof have been shown by way of example in the drawings and will be herein be described in detail. It should be understood, however, that it is not intended to limit the invention to the particular forms disclosed, but on the contrary, the intention is to cover all modification, equivalents, and alternatives falling within the spirit and scope of the invention as defined by the appended claims.

We claim:

1. A method for determining the execution time of an inter-frequency hard handoff in a mobile telecommunication system divided into a plurality of sectors, said telecommunication system including at least one mobile station providing a subscriber with mobile telecommunication services, a plurality of base transceiver stations (BTSs) each servicing one of said plurality of sectors, each BTS transmitting a unique pilot signal identifying said BTS, and a base station controller managing a sub-cell, the method comprising the steps of:

(a) receiving a pilot strength measurement message (PSMM) from the mobile station by the base station controller (BSC), the PSMM including a plurality of pilot signals each having a pilot signal strength;

(b) upon receiving the PSMM by the BSC, determining whether all sub-cells with which the mobile station is currently in communication are border frequency sub-cells;

(c) if it least one sub-cell is determined not to be a border frequency sub-cell, executing a general handoff;

(d) if all sub-cells are determined to be border frequency sub-cells, periodically ordering the PSMM from all sub-cells with which the mobile station is currently in communication by the BSC;

(e) analyzing a received PSMM transmitted from the mobile station in response to the PSMM order issued by the BSC to determine whether the pilot signal strengths received from all sub-cells are lower than a predetermined power level, T_DOWN, and activating a timer set to a predetermined time, T_TDOWN if said determination is satisfied;

(f) if the timer expires normally ordering the mobile station to execute an intra-cell inter-frequency hard handoff to a common frequency that all base transceiver stations service.

2. The method as set forth in claim 1, wherein the T_TDOWN power level is set to a power level larger than a handoff drop threshold, T_DROP.

3. The method as set forth in claim 2, wherein after the step of activating the timer, said method further comprises a step of cancelling the timer and returning to step (d) when it is determined that the received pilot signal strengths of all sub-cells are not less than T_DOWN at step (e).

4. The method as set forth in claim 3, said method further comprising a step of returning to step (d) when it is determined that the received pilot signal strengths of all sub-cells are less than T_DOWN at step (e).

5. The method as set forth in claim 1, wherein said method further comprises a step of executing a general handoff when as a result of analyzing the ordered PSMM, it is determined that an additional channel for a common frequency sub-cell is needed.

6. The method as set forth in claim 5, wherein said method further comprises a step of stopping the PSMM order and cancelling the timer.

7. The method as set forth in claim 5, wherein the determination that an additional channel for a common frequency sub-cell is needed is based on a newly received pilot signal associated with a common frequency sub-cell being received as part of the periodic PSMM message.

8. The method as set forth in claim 1, wherein based on said analyzing step if it is determined that all sub-cells must be dropped, said method further includes a step of performing an intra-cell inter-frequency hard handoff to the common frequency.

9. The method as set forth in claim 8, wherein the determination that all sub-cells must be dropped is based on all sub-cells having an associated pilot signal strength below a handoff drop threshold, T_DROP.

10. The method as set forth in claim 1, wherein said step of activating the timer further comprises the steps of:

(a) determining whether the T_TDOWN timer has already been activated; and (b) returning to step (d) if said T_TDOWN timer has already been activated, otherwise activating the T_TDOWN timer.

11. The method as set forth in claim 10, wherein said step of activating the timer further comprises a step of setting a hand-down allowance frequency to the common frequency where the common frequency is the frequency allocated to perform the inter-frequency hard handoff.

12. The method as set forth in claim 11, wherein the common frequency is stored according to the unit of each base transceiver station by the base station controller.

* * * * *